United States Patent

Norland et al.

[11] Patent Number: 5,917,595
[45] Date of Patent: Jun. 29, 1999

[54] FIBER OPTIC HOLDING FIXTURE FOR AN OPTICAL INTERFEROMETER

[75] Inventors: Eric Norland, Cranbury; Carl J. Durkow, Sewell, both of N.J.

[73] Assignee: Norland Products, Inc., New Brunswick, N.J.

[21] Appl. No.: 08/731,837

[22] Filed: Oct. 21, 1996

[51] Int. Cl.⁶ ................................................ G01B 9/02
[52] U.S. Cl. ............................ 356/345; 356/359; 385/82
[58] Field of Search .................................. 356/345, 359, 356/360, 244; 385/82

[56] References Cited

U.S. PATENT DOCUMENTS

| | | | |
|---|---|---|---|
| 5,113,465 | 5/1992 | Kawanami et al. | 385/82 |
| 5,600,439 | 2/1997 | Csipkes et al. | 356/345 |

FOREIGN PATENT DOCUMENTS

| | | |
|---|---|---|
| 55-41486 | 3/1980 | Japan . |
| 55-98711 | 7/1980 | Japan . |

*Primary Examiner*—Frank G. Font
*Assistant Examiner*—Robert Kim

[57] ABSTRACT

The present invention provides an improved fiber optic holding fixture for an optical interferometer, which can be used with a connector ferrule or a combination of an optical fiber end surrounded by a connector ferrule. The fiber optic holding fixture comprises a holding plate suitable for use in an optical interferometer, with a holding means for holding a prepared end of an optical fiber connection in a precision, repeatable orientation, with reference to a reference surface. The holding means comprises a vee-shaped groove in the holding plate which provides contact on two points of the circumference of a connector ferrule, as is known to the art. The improvement comprises a clamping means integrally formed within the holding plate which cooperates with the holding means. In addition, an operating means is provided which permits the selective application of force by the clamping means against a third point on the circumference of the connector ferrule held in position within the vee-shaped groove of the holding means by the clamping means. A method for the use of the device is also provided.

20 Claims, 3 Drawing Sheets

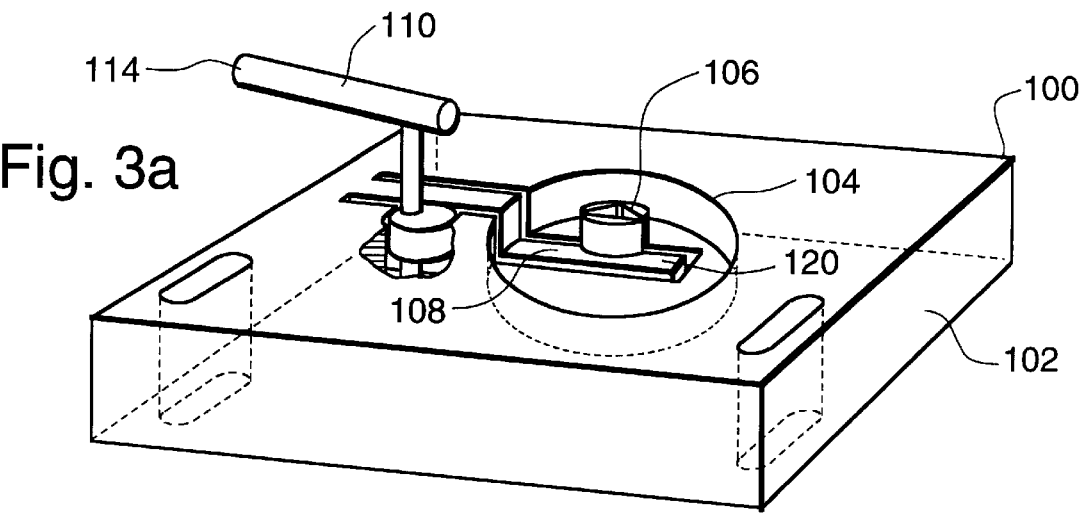
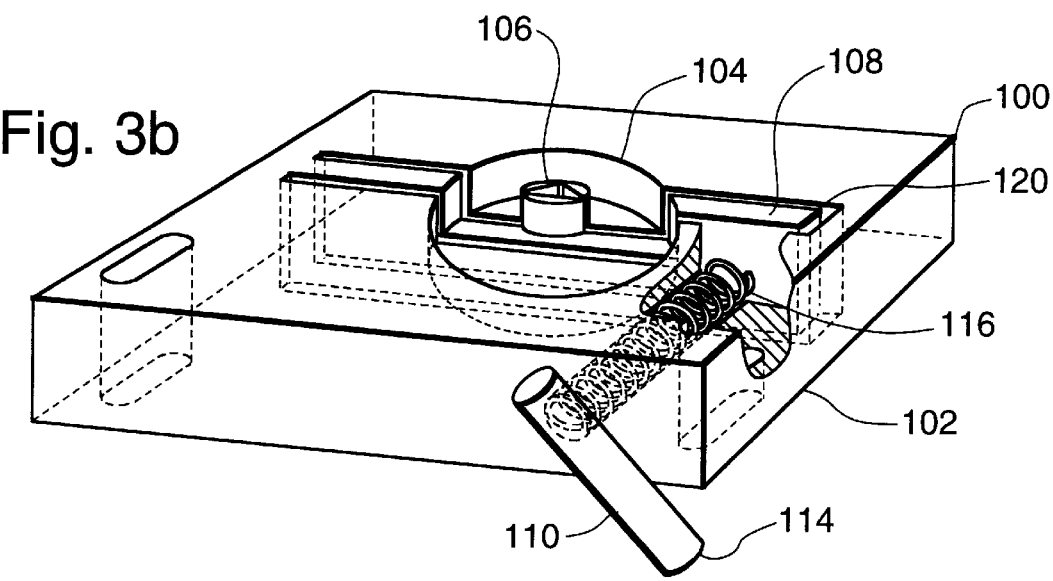

FIBER OPTIC HOLDING FIXTURE FOR AN OPTICAL INTERFEROMETER

BACKGROUND OF THE INVENTION

1. Field of the Invention

The present invention relates to an improved fiber optic holding fixture for an optical interferometer. In particular, the present invention relates to an improved fiber optic holding fixture for holding within an optical interferometer, a connector ferrule or a combination of an optical fiber end surrounded by a connector ferrule, which interferometer is suitable for inspecting the symmetry and geometry of an end face of said combined optical fiber and connector ferrule, said fiber optic holding fixture comprising:

a holding plate suitable for use in an optical interferometer;

holding means for holding in a precision, repeatable orientation, with reference to an interferometric reference surface, a connector ferrule or an end of an optical fiber connection comprising an optical fiber end surrounded by a connector ferrule, which holding means comprises a vee-shaped groove in said holding plate providing contact on two points of the circumference of said connector ferrule, and wherein the improvement comprises:

a clamping means integrally formed within said holding plate and cooperating with said holding means, said clamping means permiting the selective application of force against a third point on the circumference of said connector ferrule held in position within said vee-shaped groove of said holding means; and, operating means located remotely from said vee-shaped groove and permitting the selective application of force by said clamping means against a third point on the circumference of said connector ferrule held in position within said vee-shaped groove of said holding means by said clamping means.

According to another embodiment of the present invention, there is provided a method for inspecting the symmetry and geometry of a connector ferrule or a combination of an optical fiber end surrounded by a connector ferrule, with an optical interferometer, said method comprising the steps of:

a. preparing an end of a connector ferrule or an optical fiber surrounded by a connector ferrule for the purpose of connection, such as with a mating optical fiber prepared for connection;

b. placing said prepared connector ferrule or optical fiber end within an improved fiber optic holding fixture for holding within an optical interferometer, which interferometer is suitable for inspecting the symmetry and geometry of an end face of said connector ferrule or combined optical fiber and connector ferrule, said fiber optic holding fixture comprising:

a holding plate suitable for use in an optical interferometer;

holding means for holding in a precision, repeatable orientation, with reference to an interferometric reference surface, an end of an optical fiber connection comprising a connector ferrule or an optical fiber end surrounded by a connector ferrule, which holding means comprises a vee-shaped groove in said holding plate providing contact on two points of the circumference of said connector ferrule, and wherein the improvement comprises:

a clamping means integrally formed within said holding plate and cooperating with said holding means, said clamping means permiting the selective application of force against a third point on the circumference of said connector ferrule held in position within said vee-shaped groove of said holding means; and, operating means located remotely from said vee-shaped groove and permitting the selective application of force by said clamping means against a third point on the circumference of said connector ferrule held in position within said vee-shaped groove of said holding means by said clamping means;

c. engaging said clamping means through the operation of said operating means;

d. inspecting the symmetry and geometry of the prepared end of said connector ferrule or combination of an optical fiber end surrounded by a connector ferrule with said optical interferometer for connection suitability.

2. Description of Related Art

There has long been a need to inspect the end of a fiber optic connector for information on the geometry of the end face in the control of the polishing process and to confirm quality for assurance of performance in an application. Typical parameters to be measured are: radius of curvature of the ferrule and fiber end, symmetry of polish, and undercut or protrusion of the fiber with reference to the ferrule surface.

Interferometry is one of the preferred methods for measuring the surface of the connector because the fringe pattern provides three dimensional information about the surface of the connection, and allows the parameters to estimated or calcalulated. In order to use interferrometry to inspect for the symetry of the polish, however, it is necessary to hold the connector in a known position which is both precise and repeatable, and typically perpendicular, with respect to the reference surface, in an interferometer. This precision positioning is necessary to provide consistent reproducible measurements whenever a connector is inserted into a measuring instrument.

For example, Physical contact (PC) polished connectors having a hemispherical or dome shaped endface are intended to be polished so that the optical fiber is at the peak of the dome. When two PC polished connector are brought into contact, the fibers are the first to meet. This allows the fibers to compress slightly to form an intimate optical contact which minimizes reflections at the interface. In order to guarantee that the fibers make the first contact, a typical standard for symmetry allows the peak of the polish to be a maximum of about fifty (50) microns from the center of the fiber.

Because of the tight tolerances required in the manufacturing process, and the need to hold such tolerances on the micron level, the slightest variation in ferrule position from a centered, precise and repeatable axis with respect to the reference surface will lead to varying measurements depending on the rotation of the ferrule around the actual axis.

In the prior art, this problem has been addressed with some success by providing a holding plate with a precision bore hole. However, this solution requires both the hole of the holding plate and the ferrule of a connector to both be within a micron of one another. While some success has been obtained in this way, the machining of such tight tolerances on a consistant basis has been difficult and the useful lifetimes of such precision bore holes has been limited by wear.

Another method which has had some success is a holding plate with a clamping arm, in which a vee-groove through the plate provides support and centering for two points on the circumference of a ferrule, while a clamping arm provides a third point in a three-point contact. This arm may be designed as a bar attached to both sides of a vee groove with screws to apply holding pressure. Alternatively, one side of the clamping arm may be hinged and the other side locked in place with a screw or clamp. Another alternative could be that the hinged arm may be spring-biased. While such a construction can provide the necessary accuracy in many cases, it is often unwieldy for a production environment or complicated and expensive in design.

SUMMARY OF THE INVENTION

It is an object of the present invention to provide a fiber optic holding fixture which will correctly hold an optical fiber connector in a precise and repeatable position for testing in an interferometer.

It is a further object of the present invention to provide a fiber optic holding fixture which will correctly hold a fiber optic connector in a precise and repeatable position for testing in an interferometer with satisfactory precision and improved wear charteristics.

The other objects, features and advantages of the present invention will become more apparent in light of the following detailed description of the preferred embodiment thereof.

According to the preferred embodiment of the present invention, there is provided an improved fiber optic holding fixture for holding within an optical interferometer, a connector ferrule or a combination of an optical fiber end surrounded by a connector ferrule, which interferometer is suitable for inspecting the symmetry and geometry of an end face of said connector ferrule or combined optical fiber and connector ferrule, said fiber optic holding fixture comprising:

a holding plate suitable for use in an optical interferometer;

holding means for holding in a precision, repeatable orientation, with reference to an interferometric reference surface, a connector ferrule or an end of an optical fiber connection comprising an optical fiber end surrounded by a connector ferrule, which holding means comprises a vee-shaped groove in said holding plate providing contact on two points of the circumference of said connector ferrule, and wherein the improvement comprises:

a clamping means integrally formed within said holding plate and cooperating with said holding means, said clamping means permiting the selective application of force against a third point on the circumference of said connector ferrule held in position within said vee-shaped groove of said holding means; and, operating means located remotely from said vee-shaped groove and permitting the selective application of force by said clamping means against a third point on the circumference of said connector ferrule held in position within said vee-shaped groove of said holding means by said clamping means.

According to another embodiment of the present invention, there is provided a method for inspecting the symmetry and geometry of a connector ferrule or a combination of an optical fiber end surrounded by a connector ferrule, with an optical interferometer, said method comprising the steps of:

a. preparing an end of a connector ferrule or an optical fiber surrounded by a connector ferrule for the purpose of connection, such as with a mating optical fiber prepared for connection;

b. placing said prepared end of said connector ferrule or combination of optical fiber within a connector ferrule within an improved fiber optic holding fixture for holding within an optical interferometer, which interferometer is suitable for inspecting the symmetry and geometry of an end face of said connector ferrule or combined optical fiber and connector ferrule, said fiber optic holding fixture comprising:

a holding plate suitable for use in an optical interferometer;

holding means for holding in a precision, repeatable orientation, with reference to an interferometric reference surface, a connector ferrule or an end of an optical fiber connection comprising an optical fiber end surrounded by a connector ferrule, which holding means comprises a vee-shaped groove in said holding plate providing contact on two points of the circumference of said connector ferrule, and wherein the improvement comprises:

a clamping means integrally formed within said holding plate and cooperating with said holding means, said clamping means permiting the selective application of force against a third point on the circumference of said connector ferrule held in position within said vee-shaped groove of said holding means; and, operating means located remotely from said vee-shaped groove and permitting the selective application of force by said clamping means against a third point on the circumference of said connector ferrule held in position within said vee-shaped groove of said holding means by said clamping means;

c. engaging said clamping means through the operation of said operating means;

d. inspecting the symmetry and geometry of the prepared end of said connector ferrule or combination of an optical fiber end surrounded by a connector ferrule with said optical interferometer for connection suitability.

BRIEF DESCRIPTION OF THE DRAWINGS

FIG. 3a shows a preferred embodiment of the fiber optic holding fixture of the present invention, partly in break-away.

FIG. 3b shows a second preferred embodiment of the fiber optic holding fixture of the present invention, partly in break-away.

FIG. 3c shows a third preferred embodiment of the fiber optic holding fixture of the present invention, partly in break-away.

DETAILED DESCRIPTION OF THE PREFERRED EMBODIMENT

In the preparation of optical fibers for connection to various computer and communication devices, or to other optical fibers, the accuracy of the geometry of the fiber end is of paramount importance. If the geometry of the fiber is not within critical limits, the precision of the connection suffers. As optical fibers are called upon to provide service in ever more demanding functions, the criticality of the geometry of the fiber end becomes even more important.

Figure 1A:
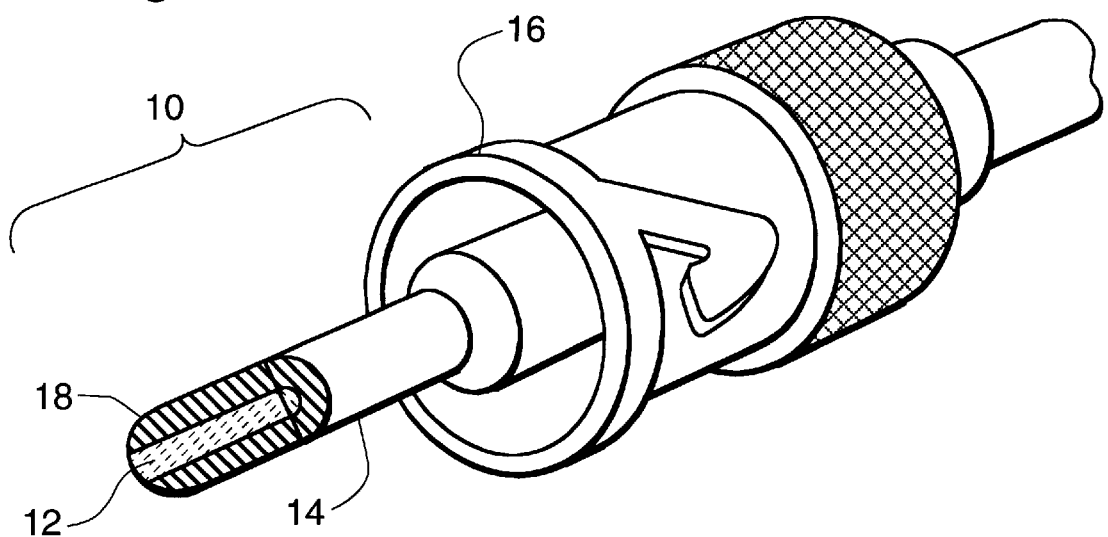
FIG. 1a shows an optical fiber in a ferrule and connector, partially in break-away.

In most applications, the fiber end is prepared for connection by enclosing its terminal end within a ferrule, which is usually a ceramic material. Then the fiber and surrounding ferrule are ground and polished as a single, integral unit to the proper geometry. For most purposes, this geometry is a uniform hemisherical shape, with the optical fiber at the apex, and the fiber and ferrule ends having the same radius of curvature, as shown in cut-away in FIG. 1a. In that drawing, the prepared connection 10 consists of an optical fiber 12 is surrounded by ceramic ferrule 14 and each has been prepared for connection to a device or apparatus or another fiber end by connection means 16. Although it is possible to prepare the ferrule 14 separately, it is common to grind and polish the ferrule 14 and fiber 12 as an intergral unit. In FIG. 1a, this prepared connection 10 is shown with the fiber 12 as the center and the apex of the hemispherical terminal end 18, surrounded by the ferrule 14, having the same spherical radius.

Figure 1B:
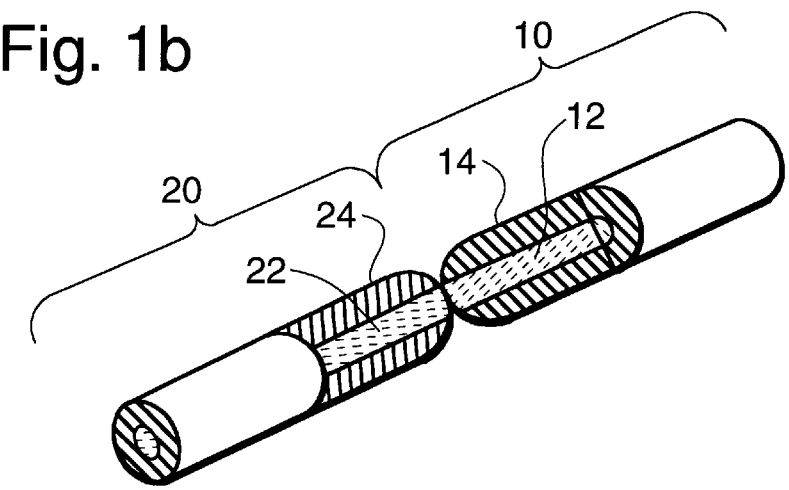
FIG. 1b shows the connection of the terminal ends of two optical fibers and ferrules, partly in break-away.

When a connection is made, as illustrated in FIG. 1b, the fiber 12 of a first connection 10 is pressed against the fiber 22 of a second connector 20 and compressed, while the ferrule 14 of the first connector 10, which is not compressive, meets the ceramic ferrule 24 of the second connector 20, and a useful connection is made. If one fiber end is undercut, the connection may have a gap, resulting in backscattering of the transmitted light and unacceptable performance. If one fiber protrudes, it may disrupt the fiber in the other connector, resulting in poor performance and, if the connection is to some computer or communication device, expensive maintenance.

Figure 2A:
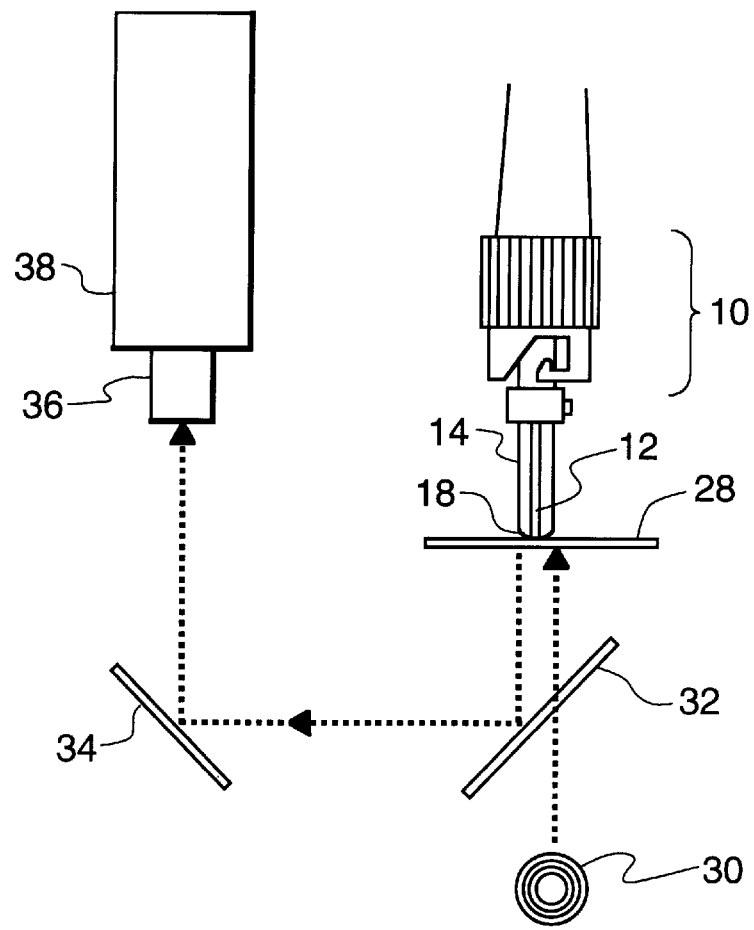
FIG. 2a shows diagramatically the set up of an optical interferometer used to determine the geometry of an optical fiber connector.
Figure 2B:
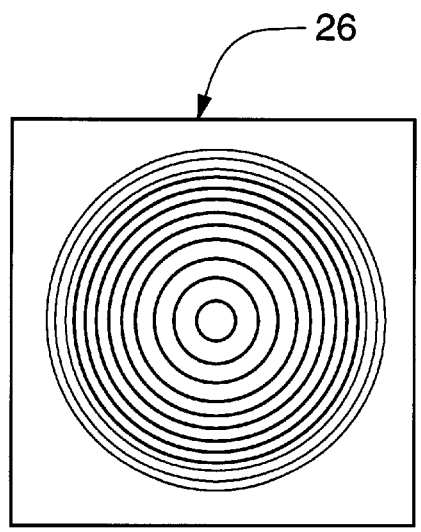
FIG. 2b shows an interferometry pattern for the geometry of an optical fiber connector.

It has been common for the suitability of a prepared connection to checked by interferometry, as shown in FIG. 2. In FIG. 2a, a prepared connector is shown in a typical interferometer testing set-up. In FIG. 2b, the resulting interferometry pattern 26 yields information about the geometry of the prepared connection.

In FIG. 2a, the connector 10 of FIG. 1a is placed in a precise and repeatable position, typically perpendicular, to a reference surface 28, which is usually transparent. On the opposite side of the reference surface 28 is a light source 30 of monochromatic light. Interposed between the reference surface 28 and the light source 30 is a beam splitter 32, such that a portion of the monochromatic light is split away and transmitted directly toward a mirror 34 and then a sensor 36, such as camera 38. The remaining portion of the monochromatic light from light source 30 is transmited through reference surface 30 and contacts the connector 10, stricking optical fiber 12 and ferrule 14. The reflected light from the connector 10 is then transmitted to mirror 34 and sensor 36, joining with the monochromatic light from the beam splitter 32 to form an interference pattern, such as interference pattern 26 shown in FIG. 2b, interpretive of the geometry of hemispherical end 18 of connector 10. In this manner details of the interference pattern will yield information on the radius and symetry of the prepared connection 10, as well as the location of the optical fiber 12 with respect to the centerline of the terminal hemispherical end 18 of the fiber 12 and ferrule 14 combination.

In order for this measurement to have a satisfactory degree of accuracy, the connector 10 should be held securely and in a precise and repeatable position, typically as nearly perpendicular as possible, with respect to the reference surface 28. With respect to preparation of connectors with the greatest accuracy, this has been done with greatest success heretofore by the precision drilling or machining of a hole in a holding plate which matches almost exactly the diameter of the ferrule material. This solution, however, has been difficult to implement in many industrial applications because of the precision required, which is obtained in most cases by sorting, rather than by holding the necessary tolerances throughout all of the holding plates and connectors manufactured.

In addition to the initial expense of such tight and matching tolerances in a precision bore for a holding plate, it is also difficult for such tolerances to be maintained in a manufacturing operation, as the operation of inserting and removing the ferrule from a holding plate causes wear on the precision bore.

Another solution in practice has been to grip the ferrule of a connector within a split sleeve formed within the holding plate, or within some mechanism attached thereto. Such a construction however has not been capable of satisfactory precision in alignment.

Another solution has been the creation of a Vee-shaped groove through the holding plate, with the two sides of the Vee forming two precision lines of contact along the sides of the connector's ferrule. The difficulty with such a design heretofore, however, has been that any clamping device providing a third point of contact, has been above the holding plate, and has interfered with many connection mechanisms. In addition, where such clampling mechanism is above the holding plate, and does not operate in the same relative plane as the sides of the Vee-groove, a rotational torque is present, working against a proper positioning of the prepared connection and a precise measurement of the connector face.

In the present invention, there is shown an improved fiber optic holding fixture, or plate 100, as shown in FIG. 3a. This fiber optic holding fixture 100 is intended for holding within an optical interferometer, a connector ferrule 14, or a combination of an optical fiber end 12 surrounded by a connector ferrule 14, such that shown in FIG. 1a. At the same time, the interferometer, such as that shown in FIG. 2a, is suitable for inspecting the symmetry and geometry of an end face of the connector ferrule 14 or combination of optical fiber 12 and connector ferrule 14 shown in FIG. 1a.

In FIG. 3a, the fiber optic holding fixture 100 of a preferred embodiment comprises a holding plate 102 suitable for use in an optical interferometer, such as the one illustrated in FIG. 2a. This holding plate 102 is further provided with a holding means 104 for holding in a precise, repeatable, typically perpendicular orientation, with reference to an interferometric reference surface, such as that shown as 28 in FIG. 2a, a connector ferrule 14 or a combination of an optical fiber 12 within a connector ferrule 14, such as that shown as 10 in FIG. 1a, comprising an optical fiber end 12 surrounded by a connector ferrule 14. This holding means 104 comprises a vee-shaped groove 106 through the holding plate 102 providing for contact on two points of the circumference of said connector ferrule 14.

While such constructions have been known previously, the device of the present invention further comprises a clamping means 108 integrally formed within the holding plate 102. This clamping means 108 cooperates with the holding means 104 and permits the selective application of force against a third point on the circumference of a connector ferrule 14 held in position within the vee-shaped groove 106 of the holding means 104.

The fiber optic holding fixture 100 of the present device is further provided with an operating means 110 located remotely from said vee-shaped groove 106. This operating means 110 permits the selective application of force by the clamping means 108 against a third point on the circumference of a connector ferrule 14 held in position within said vee-shaped groove 106 of said holding means 104 by the clamping means 108.

There are several ways in which the operating means 110 may provide the selective application of force applied through the clamping means 108 against a third point on the circumference of a ferrule 14. In the embodiment illustrated in FIG. 3a, the clamping means 108 is selectively engaged by the rotation of a cam 112, shown in break-away, and housed within holding plate 102. This cam 112 is and operated by arm 114. In the embodiment illustrated in FIG. 3b, the clamping means 108 is selectively engaged by the release of at least one spring 116, released by arm 114. In the embodiment illustrated in FIG. 3c, the clamping means 108 is selectively engaged by the movement of a rotating screw 118, shown in breakaway, which may conveniently be turned by arm 114.

As seen in FIG. 3a, the clamping means 108 is formed integrally in holding plate 102. In the embodiment of FIG. 3a and FIG. 3b, the clamping means 108 is formed by cutting the material of holding plate 102, as with wire electric discharge machining (EDM), which has been used successfully, to form an integral leaf spring 120. Other methods of cutting the holding plate 102 are possible, as are other forms of integral clamping means. For example, FIG. 3c shows the use of an integral clamping means 108 formed by EDM cutting of a bow spring 122.

It should be clear as well, that the operating means 110, in whatever form is used, can apply selective force against the clamping means 108 at any point along its length, and several positions are illustrated in FIG. 3a–c.

It is envisioned that the device of the present invention would be useful in a method for inspecting the symmetry and geometry of a connector ferrule or combination of an optical fiber end surrounded by a connector ferrule, with an optical interferometer. This method would comprise the steps of:

First, preparing an end of a connector ferrule or a combination of an optical fiber surrounded by a connector ferrule for the purpose of connection, such as with a mating optical fiber prepared for connection;

Second, placing the prepared end or a connector ferrule or combination of an optical fiber end surrounded by a connector ferrule within an improved fiber optic holding fixture for holding within an optical interferometer, as described hereinabove;

Third, engaging said clamping means through the operation of said operating means; and, Fourth, inspecting the symmetry and geometry of the prepared end of said connector ferrule or combination of an optical fiber end surrounded by a connector ferrule with said optical interferometer for connection suitability.

Other features, advantages, and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. An improved fiber optic holding fixture for holding within an optical interferometer, a combination of an optical fiber end surrounded by a connector ferrule, which interferometer is suitable for inspecting the symmetry and geometry of an end face of said combined optical fiber and connector ferrule, said fiber optic holding fixture comprising:

a holding plate suitable for use in an optical interferometer;

holding means for holding in a precise, repeatable orientation, with reference to an interferometric reference surface, an end of an optical fiber connection comprising an optical fiber end surrounded by a connector ferrule, which holding means comprises a vee-shaped groove in said holding plate providing contact on two points of the circumference of said connector ferrule, and wherein the improvement comprises:

a clamping means integrally formed within said holding plate and cooperating with said holding means, said clamping means permiting the selective application of force against a third point on the circumference of said connector ferrule held in position within said vee-shaped groove of said holding means; and, operating means located remotely from said vee-shaped groove and permitting the selective application of force by said clamping means against a third point on the circumference of said connector ferrule held in position within said vee-shaped groove of said holding means by said clamping means.

2. An improved fiber optic holding fixture for holding within an optical interferometer, a connector ferrule for use in surrounding an optical fiber in an optical fiber connection, which interferometer is suitable for inspecting the symmetry and geometry of an end face of said connector ferrule, said fiber optic holding fixture comprising:

a holding plate suitable for use in an optical interferometer;

holding means for holding in a precise, repeatable orientation, with reference to an interferometric reference surface, an end of a connector ferrule for use in surrounding an optical fiber in an optical fiber connection, which holding means comprises a vee-shaped groove in said holding plate providing contact on two points of the circumference of said connector ferrule, and wherein the improvement comprises:

a clamping means integrally formed within said holding plate and cooperating with said holding means, said clamping means permiting the selective application of force against a third point on the circumference of said connector ferrule held in position within said vee-shaped groove of said holding means; and, operating means located remotely from said vee-shaped groove and permitting the selective application of force by said clamping means against a third point on the circumference of said connector ferrule held in position within said vee-shaped groove of said holding means by said clamping means.

3. A method for inspecting the symmetry and geometry of a combination of an optical fiber end surrounded by a connector ferrule, with an optical interferometer, said method comprising the steps of:

a. preparing an end of an optical fiber surrounded by a connector ferrule for the purpose of connection, such as with a mating optical fiber prepared for connection;

b. placing said prepared optical fiber end within an improved fiber optic holding fixture for holding within an optical interferometer, which interferometer is suitable for inspecting the symmetry and geometry of an end face of said combined optical fiber and connector ferrule, said fiber optic holding fixture comprising:

a holding plate suitable for use in an optical interferometer;

holding means for holding in a precise, repeatable orientation, with reference to an interferometric reference surface, an end of an optical fiber connection comprising an optical fiber end surrounded by a connector ferrule, which holding means comprises a vee-shaped groove in said holding plate providing contact on two points of the circumference of said connector ferrule, and wherein the improvement comprises:

a clamping means integrally formed within said holding plate and cooperating with said holding means, said clamping means permiting the selective application of force against a third point on the circumference of said connector ferrule held in position within said vee-shaped groove of said holding means; and, operating means located remotely from said vee-shaped groove and permitting the selective application of force by said clamping means against a third point on the circumference of said connector ferrule held in position within said vee-shaped groove of said holding means by said clamping means;

c. engaging said clamping means through the operation of said operating means;

d. inspecting the symmetry and geometry of the prepared end of said combination of an optical fiber end surrounded by a connector ferrule with said optical interferometer for connection suitability.

4. A method for inspecting the symmetry and geometry of a connector ferrule for use in surrounding an optical fiber in an optical fiber connection, with an optical interferometer, said method comprising the steps of:

a. preparing an end of a connector ferrule for the purpose of connection, such as with a mating optical fiber prepared for connection;

b. placing said prepared connector ferrule within an improved fiber optic holding fixture for holding within an optical interferometer, which interferometer is suitable for inspecting the symmetry and geometry of an end face of said connector ferrule, said fiber optic holding fixture comprising:

a holding plate suitable for use in an optical interferometer;

holding means for holding in a precise, repeatable orientation, with reference to an interferometric reference surface, an end of a connector ferrule, which holding means comprises a vee-shaped groove in said holding plate providing contact on two points of the circumference of said connector ferrule, and wherein the improvement comprises:

a clamping means integrally formed within said holding plate and cooperating with said holding means, said clamping means permiting the selective application of force against a third point on the circumference of said connector ferrule held in position within said vee-shaped groove of said holding means; and, operating means located remotely from said vee-shaped groove and permitting the selective application of force by said clamping means against a third point on the circumference of said connector ferrule held in position within said vee-shaped groove of said holding means by said clamping means;

c. engaging said clamping means through the operation of said operating means;

d. inspecting the symmetry and geometry of said prepared end of said connector ferrule with said optical interferometer for connection suitability.

5. The improved fiber optic holding fixture of claim 1 wherein the selective application of force applied by said clamping means against a third point on the circumference of said ferrule is selectively engaged by the release of at least one spring.

6. The improved fiber optic holding fixture of claim 1 wherein the selective application of force applied by said clamping means against a third point on the circumference of said ferrule is selectively engaged by the rotation of a cam.

7. The improved fiber optic holding fixture of claim 1 wherein the selective application of force applied by said clamping means against a third point on the circumference of said ferrule is selectively engaged by the movement of a rotating screw.

8. The improved fiber optic holding fixture of claim 1 wherein said clamping means is integrally formed within said holding plate by the machining of at least one cut in said holding plate to form an integral leaf spring, which is able to apply force against said connector ferrule positioned within said vee-shaped groove of said holding means when force is applied against said leaf spring by said operating means.

9. The improved fiber optic holding fixture of claim 8 wherein force is applied by said operating means against a free end of said leaf spring and force is applied against said connector ferrule by said leaf spring at some point along its length.

10. The improved fiber optic holding fixture of claim 8 wherein force is applied by said operating means against said leaf spring at some point along its length and force is applied against said connector ferrule by said leaf spring by a free end thereof.

11. The improved fiber optic holding fixture of claim 8 wherein the machining of said holding plate to form said leaf spring is effected by Electric Discharge Machining.

12. The improved fiber optic holding fixture of claim 1 wherein said clamping means is integrally formed within said holding plate by the machining of at least one cut in said holding plate to form an integral bow spring, which is able to apply force against said connector ferrule positioned within said vee-shaped groove of said holding means when force is applied against said bow spring by said operating means.

13. The improved fiber optic holding fixture of claim 2 wherein the selective application of force applied by said clamping means against a third point on the circumference of said ferrule is selectively engaged by the release of at least one spring.

14. The improved fiber optic holding fixture of claim 2 wherein the selective application of force applied by said clamping means against a third point on the circumference of said ferrule is selectively engaged by the rotation of a cam.

15. The improved fiber optic holding fixture of claim 2 wherein the selective application of force applied by said clamping means against a third point on the circumference of said ferrule is selectively engaged by the movement of a rotating screw.

16. The improved fiber optic holding fixture of claim 2 wherein said clamping means is integrally formed within said holding plate by the machining of at least one cut in said holding plate to form an integral leaf spring, which is able to apply force against said connector ferrule positioned within said vee-shaped groove of said holding means when force is applied against said leaf spring by said operating means.

17. The improved fiber optic holding fixture of claim 16 wherein force is applied by said operating means against a free end of said leaf spring and force is applied against said connector ferrule by said leaf spring at some point along its length.

18. The improved fiber optic holding fixture of claim 16 wherein force is applied by said operating means against said leaf spring at some point along its length and force is applied against said connector ferrule by said leaf spring by a free end thereof.

19. The improved fiber optic holding fixture of claim 16 wherein the machining of said holding plate to form said leaf spring is effected by Electric Discharge Machining.

20. The improved fiber optic holding fixture of claim 2 wherein said clamping means is integrally formed within said holding plate by the machining of at least one cut in said holding plate to form an integral bow spring, which is able to apply force against said connector ferrule positioned within said vee-shaped groove of said holding means when force is applied against said bow spring by said operating means.

* * * * *